United States Patent [19]

Hwang

[11] Patent Number: 5,331,461

[45] Date of Patent: Jul. 19, 1994

[54] RAIN HOOD ASSEMBLY FOR EXTERIORLY MOUNTED REARVIEW MIRROR

[76] Inventor: Tsong C. Hwang, 54-5, Shin Sheng South Road, Sec. 1, Taipei, Taiwan

[21] Appl. No.: 910,414

[22] Filed: Jul. 8, 1992

[51] Int. Cl.$^5$ .......................... B60R 1/06; G02B 5/08; G02B 7/18
[52] U.S. Cl. ..................................... 359/507; 359/611
[58] Field of Search ............... 359/507, 511, 611, 601, 359/871

[56] References Cited

U.S. PATENT DOCUMENTS

| | | | |
|---|---|---|---|
| 2,649,839 | 8/1953 | Condon | 359/507 |
| 4,750,824 | 6/1988 | Soumenis | 359/507 |

FOREIGN PATENT DOCUMENTS

| | | | |
|---|---|---|---|
| 44078 | 3/1980 | Japan | 359/507 |
| 155133 | 9/1982 | Japan | 359/511 |
| 202949 | 9/1986 | Japan | 359/507 |

*Primary Examiner*—Jon W. Henry
*Attorney, Agent, or Firm*—Fish & Richardson

[57] ABSTRACT

A rain hood assembly is position-adjustably mounted on an exteriorly mounted rearview mirror for protecting the rearview mirror and the side window adjacent to the mirror from rain. The assembly may have a body of which the position relative to the window may be adjusted. A strip of rubber is provided and is position-adjustably fixed on the body for contacting the window. In alternate, the hood assembly may be adjusted in size so as to be mounted on rearview mirror of different size.

14 Claims, 10 Drawing Sheets

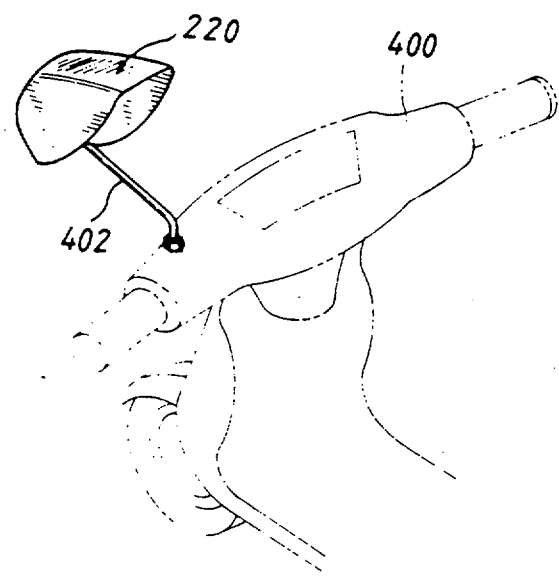
FIG. 9
FIG. 11
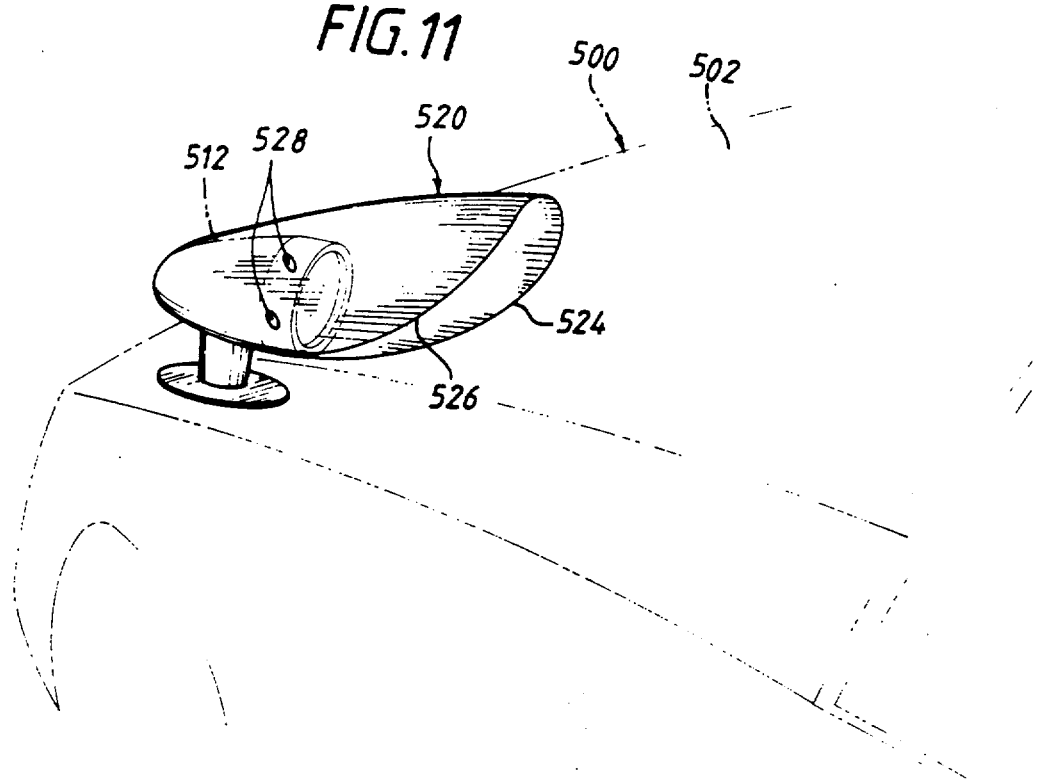

RAIN HOOD ASSEMBLY FOR EXTERIORLY MOUNTED REARVIEW MIRROR

FIELD OF INVENTION

The present invention relates to a rain hood assembly for an exteriorly mounted rearview mirror on a vehicle or the like, and more particularly, to a hood assembly which may be position-adjustably mounted to the housing of the mirror so as to protect the mirror and the side window adjacent to the mirror and below the hood assembly from rain.

BACKGROUND

Rearview mirror of vehicles like automobiles are usually mounted externally on the driver's door and on the passenger's door as well. In order to use the mirror, the driver must look through the side window adjacent the mirror. However, in poor driving condition such as rain, the driver's view through the externally mounted rearview mirror may be obstructed, either because of moisture on the mirror itself or on the window adjacent to the window through which the driver must look.

An object of the present invention is to provide a new rain hood assembly for protecting the externally mounted rearview mirrors on a vehicle and the adjacent window from rain.

A further object of the present invention is to provide a rain hood assembly which may be easily, adjustably mounted to the housing or support of the mirror.

A further object of the present invention is to provide a new rain hood assembly for protecting the externally mounted rearview mirrors on a vehicle wherein the rain hood assembly may be adjustable in size for mounting on rearview mirror housings of different size.

SUMMARY OF THE INVENTION

According to one aspect of the present, there is provided a rain hood assembly for an exteriorly mounted rearview mirror of the type having a housing adjacent to a side window wherein the assembly is adjustably mounted to the mirror housing. The hood assembly of the present invention comprises a body, means for adjustably mounting the body to the mirror housing, a strip of rubber for contacting the window along the edge of the rubber, and means for adjustably securing the rubber to the top surface of the body.

The body has a substantially rectangular cross-sectional shape with rounded corners and comprises a front wall from which extend rearwardly a top surface provided with a pair of transverse slots and a longitudinal slot, a bottom surface provided with a pair of longitudinal slots, and a side wall. The bottom surface is shorter than the top surface and the side wall is formed of transparent material.

The body mounting means comprises a perforated member integrally formed with the top surface of the body or secured to the bottom side of the top surface of the body for positioning the body relative to the mirror housing. The perforated member cooperates with two or more bolts vertically screwed onto the top surface of the mirror housing to position the body relative to the mirror housing by receiving the exposed ends of the bolts in its perforations.

The body mounting means further comprises a C-shaped bracket having a vertical portion, a top arm provided with slot along its length to be fastened to the top surface of the body, and a bottom arm provided with slot along its length to be fastened to the bottom surface of the body.

The body mounting means further comprises a pad supported by first and second supports and disposed between the bottom surface of the mirror housing and the bottom surface of the body. The first support is provided with a plurality of slots and the second support is provided with threaded apertures corresponding to the slots of the first support.

The body is mounted on the mirror housing in a manner that the mirror housing is sandwiched between the top surface and the bottom surface of the body.

A strip of rubber for contacting the window is fixed on a member which can be adjustably secured to the top surface of the body.

According to another aspect of the present invention, there is provided a rain hood assembly which is better suited for installation on a rearview mirror that is mounted to the front end of a vehicle. And the assembly may be size-adjustably mounted on a rearview mirror housing.

The invention is explained in more detail with reference to the drawings, in which:

BRIEF DESCRIPTION OF THE DRAWINGS

FIG. 9 is a perspective view of the fourth embodiment of the rain hood assembly installed on a rearview mirror mounted to the front end of a motorcycle;

FIG. 11 is a perspective view of a sixth embodiment of the rain hood assembly of this invention, illustrating installation on a rearview mirror mounted on the hood of a vehicle.

DETAILED DESCRIPTION OF THE INVENTION

Figure 1:
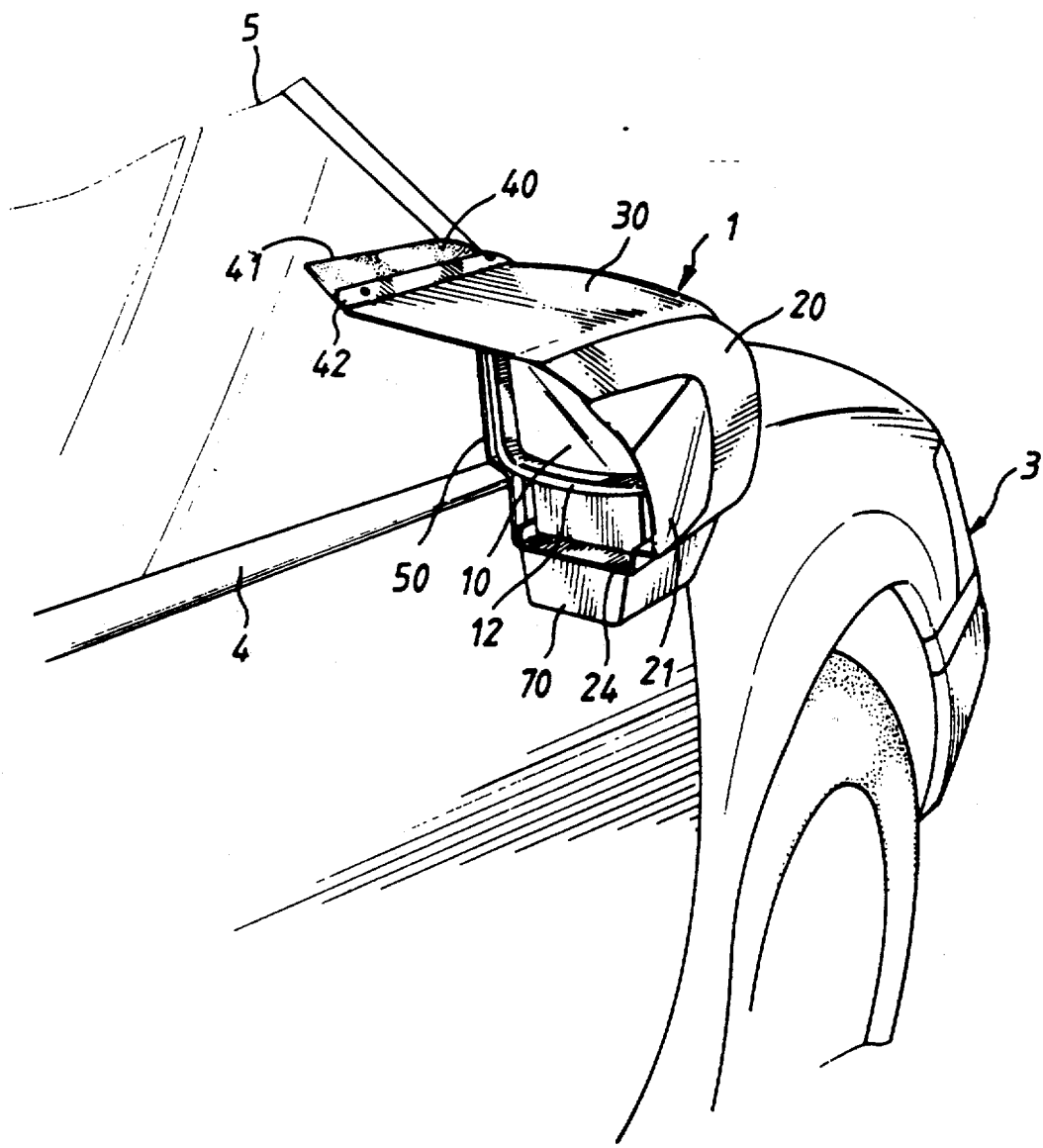
FIG. 1 is a perspective view of the hood assembly of a first embodiment of the present invention mounted on the passenger's side of a vehicle.
Figure 2A:
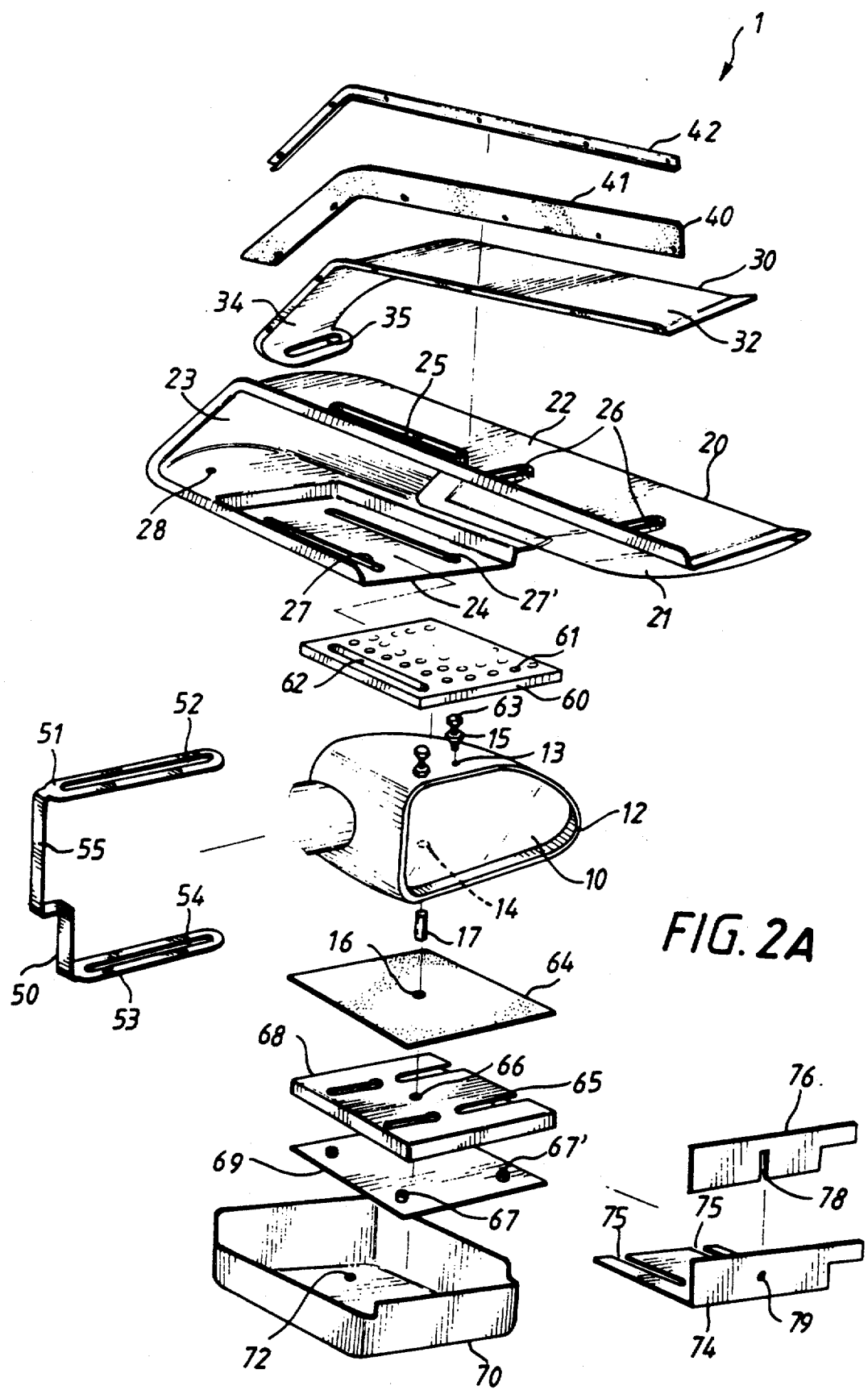
FIG. 2A is an exploded isometric view of the hood assembly shown in FIG. 1.
Figure 2B:
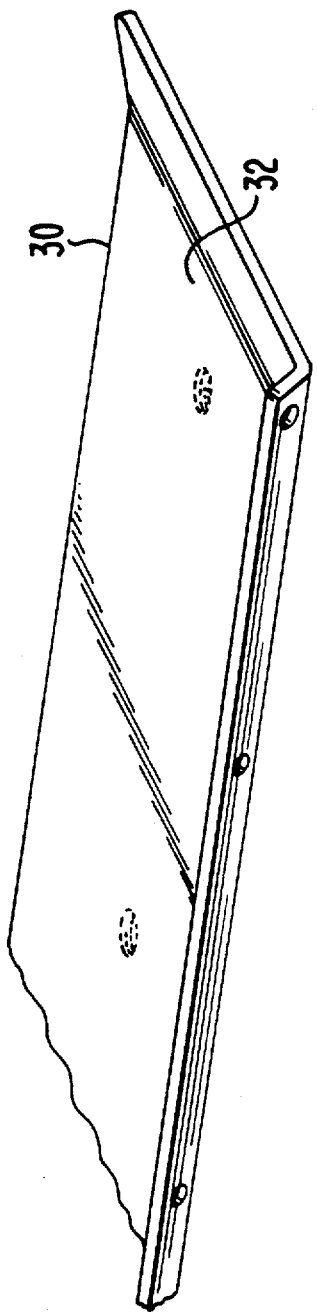
FIG. 2B is an enlarged view of the flat portion of the cover illustrating the threaded holes in phantom.

Referring to FIGS. 1 and 2, a rearview mirror 10 is supported by a housing 12 which is mounted to a door 4 of a vehicle 3 and is adjacent to a side window 5. The present invention is directed to a rain hood assembly 1 position-adjustably mounted to the mirror housing 12. According to a first embodiment of the present invention, the hood assembly 1 comprises a body 20 having a front wall 23 from which extend rearwardly a top surface 22, a bottom surface 24 and a side wall 21. The top surface 22 is provided with a longitudinal slot 25 on its front portion and a pair of transverse slots 26 on its rear portion. The bottom surface 24 is shorter than the top surface and is provided with an aperture 28 at its front portion and a pair of longitudinal slots 27 and 27' with slot 27 corresponding to the slot 25 of the top surface 22. The side wall 21 is transparent. In this embodiment, the body 20 has a substantially rectangular cross-sectional shape. It can be either made from a sheet of metal, with a transparent material such as plastic or acrylic forming the side wall and bonded to the shaped top and bottom surface, or integrally formed from transparent plastic and painted with non-transparent material except the side wall portion.

A sheet of rectangular member 60 is provided with many apertures 61 and a longitudinal slot 62 corresponding to the slot 25 of the top surface 22 of the body 20. The member 60 can be formed from rubber or plastic, and then is glued or affixed to, or integrally formed with the bottom side of the top surface 22 of the body 20, with the slot 62 aligning with slot 25.

Two conventional bolts 63 are vertically, partially screwed into two threaded holes 13 provided on the top surface of the mirror housing 12. The exposed heights of the two bolts 63 can be adjusted to be the same and fixed by nuts 15, respectively. The bolts 63 are selected such that their heads can be received in the apertures 61 of the member 60.

With the perforated member 60 provided on the bottom side of the top surface 22 of the body 20, the body 20 can be initially positioned on the mirror housing 12 by receiving the two heads of the bolts 63 in two suitably selected apertures 61.

The hood assembly 1 further comprises a C-shaped bracket 50, usually made of metal, to hold the body 20 which has been positioned on the mirror housing. The bracket 50 has a vertical portion 55, a top arm 51 provided with a slot 52, and a bottom arm 53 also provided with a slot 54. The distance between the two arms 51 and 53 is substantially equal to that between the top and bottom surfaces 22 and 24 of the body 20, such that the bracket 50 can be transversely connected to the body 20 by conventional screws and nuts (not shown), with a screw passing through the slot 25 on top surface 22 and slot 52 on top arm 51, and a screw passing through the slot 27 on bottom surface 24 and slot 54 on bottom arm 53. And the vertical portion 55 is between the window 5 and the left side of the mirror housing 12, as shown in FIG. 1.

To firmly securing the hood assembly 1 to the mirror housing 12, a pad 64 supported by first and second supports 68 and 69 is disposed between the bottom of the mirror housing 12 and the bottom surface 24 of the body 20. The pad 64 can be formed of rubber, and the support can be formed of metal sheet. The first support 65 is provided with four transverse slots 65 for transverse adjustment of the support 65 with respect to the mirror housing 12. The second support 69 is provided with four threaded holes 67 corresponding to the slots 65 and also corresponding to the slots 27 and 27' of the bottom surface 24 of the body 20.

Using bolts and nuts (not shown), with the bolts passing through slots 27 and 27' on bottom surface 24, holes 67 on the second support 67 and slots 65 on the first support 68, the pad 64 can be forced to bear against the bottom of the mirror housing 12, and thus the body 20 is firmly mounted to the mirror housing 12. A pin 17 can be inserted through a hole 66 on the first support 65, an aperture 16 on the pad 64, and an aperture 14 on the bottom of the mirror housing 12 to prevent the sliding movement between the pad 64 and the bottom of the mirror housing 12.

An elongated strip of rubber 40 having an edge 41 is fastened on a cover 30 along the edge of the cover 30 with the edge 41 projecting out from the cover 30. Such fastening can be obtained by using conventional screw and nut, with an elongated pressing strip 42 pressing on the edge of the rubber 40 opposing the edge 41.

The cover 30 has a flat portion 32 provided on its bottom side with two threaded holes corresponding to the slots 26 on the top surface 22 of the body 20, and a downwardly curved front portion 34 extending from the flat portion 32 and provided with a transverse slot 35 corresponding to the aperture 28 on the bottom surface 24 of the body 20 on its end. Thus, the cover 30 can be mounted to the top surface 22 of the body 20, with using bolts passing through the slots 26 on the top surface 22 and the thread holes on the bottom side of the cover 30, and bolt passing the hole 28 on the bottom surface 24 and the slot 35 on the cover 30. The relative position of the cover 30 with respect to the body 20 can be adjusted while the bolts are loose, such that the rubber strip 40 uniformly contacts the outer surface of the side window 5 with its edge 41, as shown in FIG. 1, and, thereafter, locked into place by tightening the bolts.

For aesthetic appearance of the hood assembly 1 of the invention, a bottom cover 70 can be fastened to the bottom side of the bottom surface 24 of the body 20 for covering the exposed bolts used to fasten the body 20, as shown in FIG. 1. This can be achieved by using a bolt passing through a hole 72 provided on the bottom cover 70 and a nut affixed to the bottom side of the surface 24. Further, a rear cover 76 is provided to cover the rear portion of the assembly below the mirror housing 12. The rear cover 76 is provided with a vertical slot 78 and supported by a L-shaped member 74 by using a bolt passing a hole 79 on a vertical portion of the member 74 and the slot 78. The horizontal portion of the member 74 is provided with two longitudinal slots 75, such that it can be disposed between the second support 69 and the bottom surface 24 of the body 20 and tightly clamped therebetween.

Figure 3:
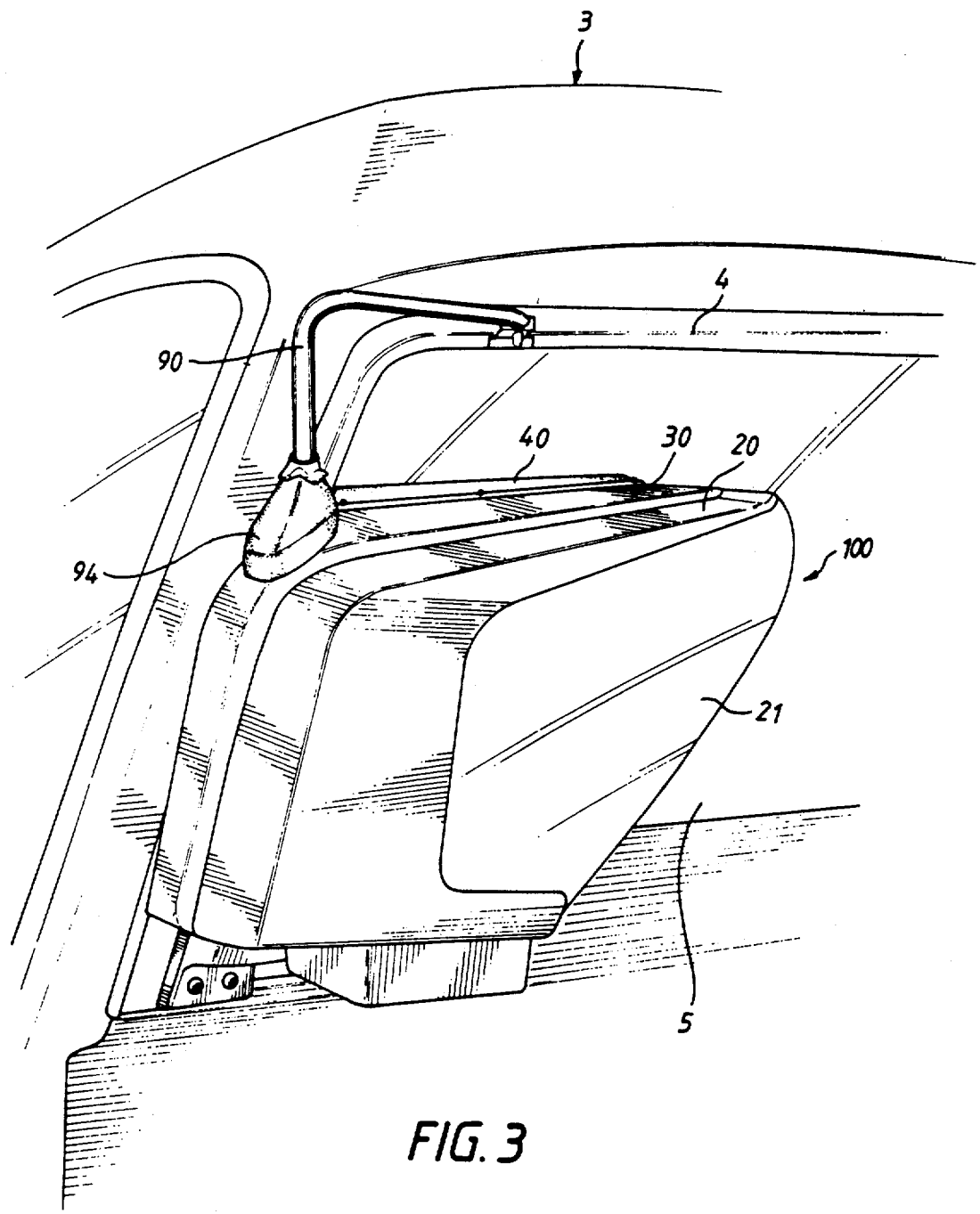
FIG. 3 is a perspective view of a second embodiment of the hood assembly of the present invention mounted on the driver's side of a vehicle.

FIG. 3 shows a second embodiment of the present invention for use on the driver's side of a vehicle. In this embodiment a rain hood assembly 100 is mounted to a rearview mirror (not shown) which is supported by a element 90 connected to a door of a vehicle 3. The hood assembly 100 is a mirror image of the hood assembly 1 of the first embodiment except that the cover 30, top surface 22 of the body 20 and the positioning member 60 are provided with an aperture (not shown) for passing through the element 90. Further, a seal 94 is attached to the element 90 above the mentioned aperture to prevent rain from running down into the aperture.

Figure 4:
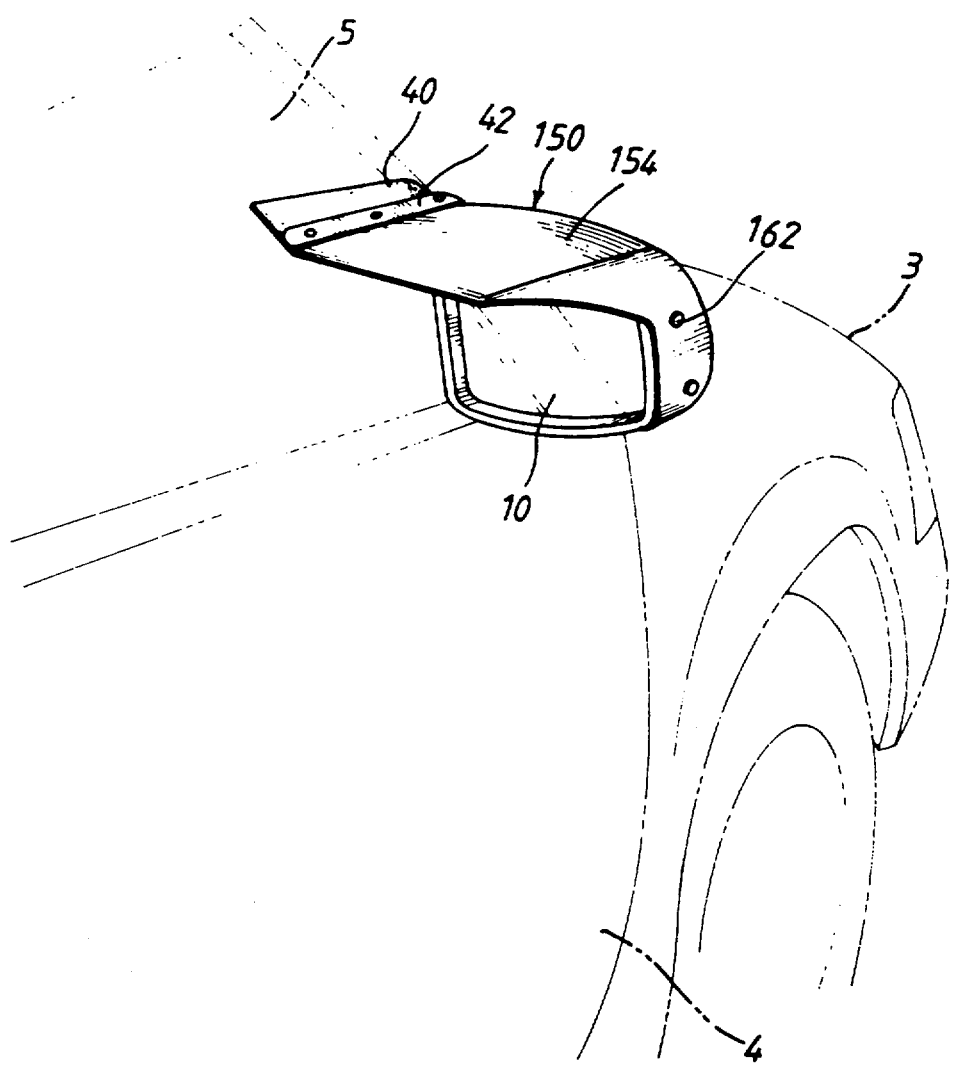
FIG. 4 is a perspective view of the hood assembly of a third embodiment of the present invention mounted on the passenger's side of an automobile.
Figure 5:
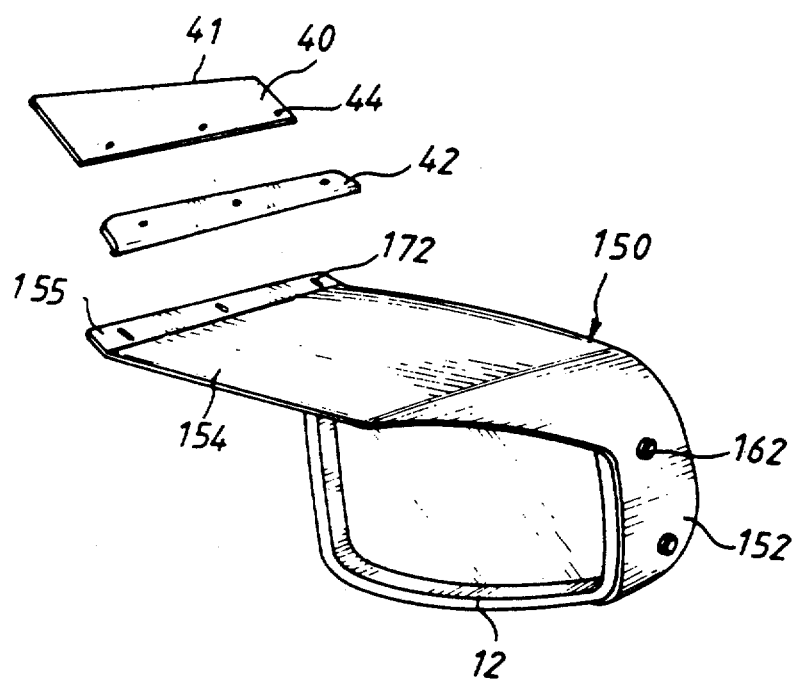
FIG. 5 is an exploded isometric view of the hood assembly shown in FIG. 4.

FIGS. 4 and 5 illustrate a third embodiment of the present invention. In this embodiment, a rain hood assembly 150 is provided for a rearview mirror 10 supported by a housing 12 which is mounted to a door 4 of an automobile 3 and is adjacent to a side window 5. The housing 12 is usually defined by a top edge, a bottom edge and two side edges. The rain hood assembly 150 has a body 152 which is integrally formed and dimensioned to accommodate the housing 12 and comprises a top surface 154 extending rearwardly and upwardly across the top edge of the housing 12.

Several transverse slots 172, for example, five slots, are provided on the top surface 154 along an edge 155 which is adjacent to the side window 5 when the assembly has been mounted on the housing 12. An elongated strip of rubber 40 having an edge 41 and apertures 44 on the opposite edge for fastening to the top surface 154 is provided. The rubber 40 can be fastened to the top surface 154 at the edges 155, by using conventional screws passing through the apertures on the rubber 40 and the corresponding slots 172 on the top surface 154 and a elongated pressing strip 42 pressing on the rubber 40, with the edge 41 projecting out from the edge 155 for contacting the side window 5.

The hood assembly 150 can be secured to the housing 12 by using conventional bolts 162 screwed into the body 152 and the housing 12 inside the body 152. Alternatively, the body 152 can be integrally formed with the housing 12, and thus no securing means is necessary.

It is understood that, by providing the transverse slots 17, the rubber 40 can be position-adjustably mounted on the top surface 154, such that the edge 41 of the rubber 40 can uniformly contact the side window 5 when the rain hood assembly is assembled and mounted on the mirror housing 12. With the top surface 154 extending rearwardly and upwardly across the top edge of the housing 12 and the edge 41 of the rubber 40 uniformly contacting the side window 5, the rearview mirror and the side window adjacent to the mirror and below the hood assembly can thus be protected from rain.

Figure 6:
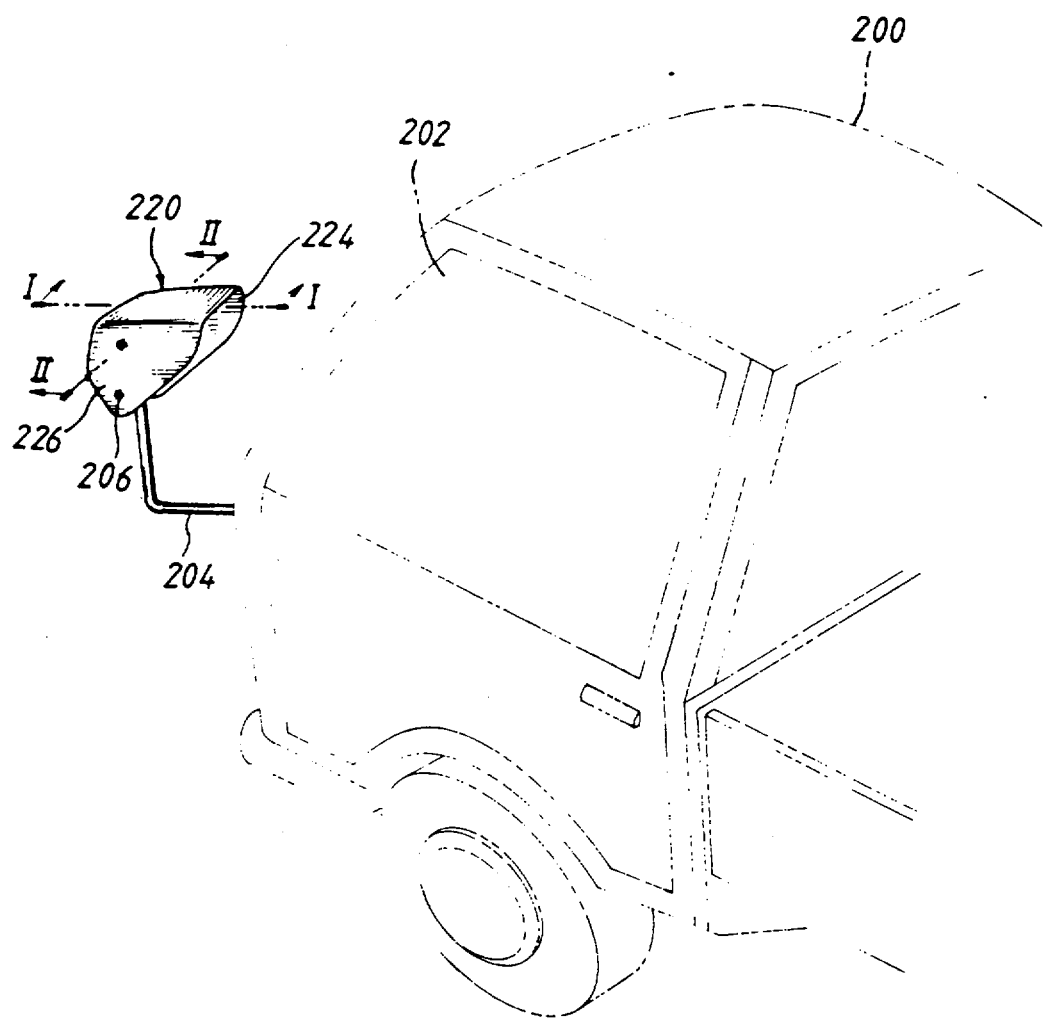
FIG. 6 is a perspective view of a fourth embodiment of the rain hood assembly of this invention, illustrating installation on a rearview mirror mounted to the front end of a truck.
Figure 7:
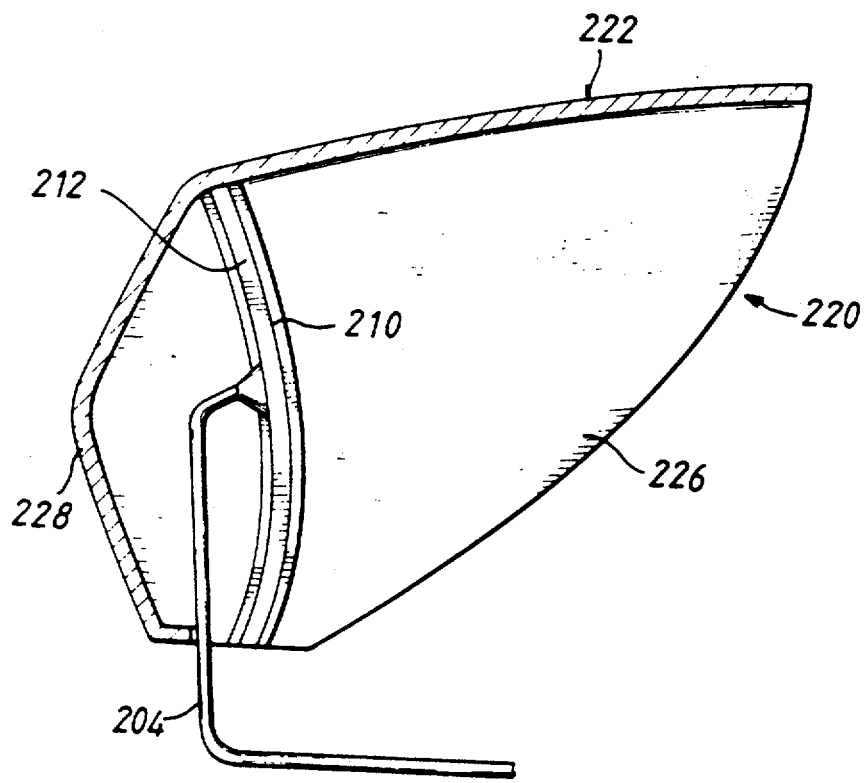
FIG. 7 is an enlarged sectional view taken on the line I—I of FIG. 6.
Figure 8:
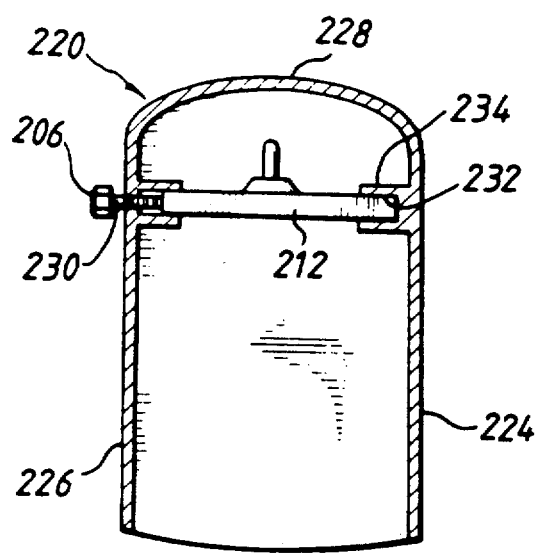
FIG. 8 is an enlarged sectional view taken on the line II—II of FIG. 6.

FIGS. 6 through 8 illustrate a fourth embodiment of the present invention. In this embodiment, a rain hood 220 is adapted for use on a rearview mirror mounted to the front end of a truck 200. As shown in FIG. 7, the rearview mirror has a mirrored glass 210 and a housing 212 and is mounted to the truck by means of a support arm 204. The hood 220 is integrally formed and comprises a front wall 228 from which extends rearwardly a top surface 222 and two symmetrical side walls 224 and 226.

Each of the side walls is provided at its front inner portion a groove 232 for engaging the edge of the mirror housing 212. The groove 232, as shown in FIG. 8, is defined by two spaced projections 234 inwardly protruding from the side wall and extending downwardly along the entire height of the side wall, and is so dimensioned that both of the side edges of the mirror housing 212 can be fitted into the grooves 234 of the side walls 226 and 224, respectively, such that the hood 220 may mounted on the mirror housing 212 by engaging the edges of the mirror housing 212.

Conventional fastening means may be provided to secure the hood 220 to the mirror housing 212. This may be achieved by providing two bolts 206 on one of the side walls, e.g. side wall 226, at positions corresponding to the groove 232, and tightening the bolts against the edge of the housing 212. Alternatively, the hood 220 may be integrally formed with the mirror housing 212 and therefore no fastening means is needed.

FIG. 9 illustrates the fourth embodiment of the hood of the invention mounted on a rearview mirror (not shown) connected by a supporting arm 402 to a motorcycle 400. The way the hood 220 mounted to the mirror housing of the motorcycle 400 is similar to the above described for a truck, and thus will not be redescribed.

Figure 10:
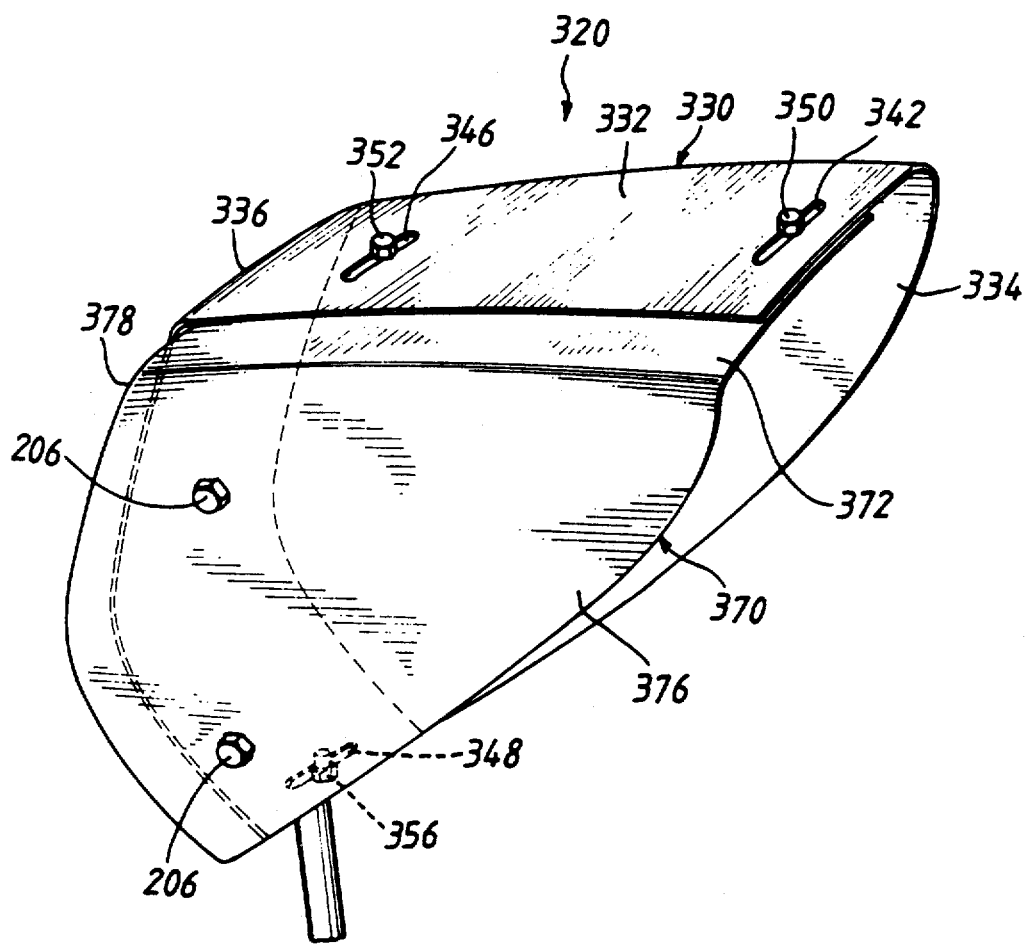
FIG. 10 is a perspective view of a fifth embodiment of the rain hood assembly of this invention.

FIG. 10 illustrates a fifth embodiment which is a modification of the fourth embodiment. In this embodiment, a hood assembly 320 comprises two symmetrical first and second parts 330 and 370. The first part and second parts each can be formed as a right or left half of the hood 220 according to the third embodiment except that the top surface of each half is enlarged. The first part 330 comprises a front wall 336 from which extends a side wall 334 provided a groove (not shown), similar to that in the fourth embodiment, for engaging one side edge of a mirror housing (not shown), and a top surface 332 provided with a pair of transverse slots 342 and 346 for position-adjustment of the first part 330 with respect to the mirror housing. Another transverse slot 348 is also provided at the lower portion of the front wall 336.

The second part 370 is a mirror image of the first part 330 except that three thread holes (not shown) corresponding to the transverse slot of the first part are provided instead of the slots. Thus, with the top surface 332 of the first part 330 overlapping the top surface 372 of the second part 370, these two parts can be connected together as a hood similar to that of the fourth embodiment while the transverse distance between the two side walls can be adjusted in accordance with the width of a mirror housing by means of the slots provided.

The thus connected hood assembly 320 can be mounted on the mirror housing by engaging the side edges of the housing and firmly secured to the housing by tightening the bolts 206.

FIG. 11 illustrates a sixth embodiment of the invention. In this embodiment, a hood 520 is integrally formed and fastened to a rearview mirror housing 512 mounted on the hood of an automobile 500, by two screws 528 screwed into one side of the hood 520 and the housing and another two screws screwed (not shown) into the other side. The hood 520 has a semicircular cross-sectional shape, integrally molded of plastic, and has two opposite inclined edges 524 and 526 for accommodating the rearview mirror housing 512 and protecting it from rain. Alternatively, the hood 520 may be integrally formed with the housing 512, and thus no fastening means is needed.

It should now be understood that the rain hood assembly in accordance with the present invention can be adapted to be mounted on any existing rearview mirror of various types in a very simple way in order to protect the rearview mirror against rain.

I claim:

1. A rain hood assembly for an exteriorly mounted rearview mirror of the type having a housing adjacent to a side window wherein said assembly is adjustably mounted to said mirror housing, said assembly comprising:

a body having a substantially rectangular cross-sectional shape with rounded corners and comprising a top surface provided with a pair of transverse slots and a longitudinal slot, a bottom surface provided with a pair of longitudinal slots and a transparent side wall;

means for adjustably mounting said body to said mirror housing in a manner that said mirror housing is sandwiched between said top surface and said bottom surface of said body;

a strip of rubber for contacting said window along the edge of the rubber; and means for adjustably securing said rubber strip to said top surface of said body, whereby the mirror and the window adjacent to the mirror and below the hood assembly are protected from rain.

2. The assembly according to claim 1, wherein said means for adjustable mounting said body comprises a perforated member for positioning said body relative to said mirror housing.

3. The assembly according to claim 2, wherein said perforated member for positioning said body is fixed to at least one of the bottom side of said top surface of said body and integrally formed with said top surface.

4. The assembly according to claim 1, wherein said body mounting means further comprises a C-shaped bracket having a vertical portion, a top arm provided with slot along its length to be fastened to said top surface of said body, and a bottom arm provided with slot along its length to be fastened to said bottom surface of said body.

5. The assembly according to claim 1, wherein said body mounting means further comprises a pad supported by first and second supports and disposed between the bottom of said mirror housing and said bottom surface of said body.

6. The assembly according to claim 5, wherein said first support is provided with a plurality of slots and said second support is provided with threaded apertures corresponding to the slots of said first support.

7. The assembly according to claim 1, wherein said rubber securing means comprises a cover having a flat portion provided with threaded holes on its bottom side and a downwardly curved portion provided with a transverse slot at its end, such that the cover may be position-adjustably fixed on said top surface of said body.

8. The assembly according to claim 7, wherein said rubber strip is fixed on the edge of said cover by bolt and nut along its entire length for contacting said side window.

9. The assembly according to claims 1, wherein said top surface of said body and said rubber strip securing means each is provided with an aperture for passing through a supporting arm that supports the rearview mirror, and a rubber seal for sealing said aperture against rain.

10. The assembly according to claim 1, wherein said body is integrally formed from transparent plastic and painted with non-transparent material except for said side wall portion.

11. A rain hood assembly for an exteriorly mounted rearview mirror of the type having a mirror housing defined by a top edge, a bottom edge, and two side edges, said mirror housing disposed adjacent to a side window, said hood assembly having a body dimensioned to accommodate said housing wherein said body comprises a top surface extending rearwardly and slanting upwards across said top edge of said housing, and a strip of rubber is position-adjustably attached to said top surface along an edge adjacent to said side window for uniformly contacting said side window.

12. The assembly according to claim 11, wherein a plurality of transverse slots are provided on said top surface along said edge for position-adjustably fastening said rubber strip.

13. The assembly according to claim 11, wherein said body is integrally formed and secured to said mirror housing by screws.

14. The assembly according to claim 11, wherein said body is integrally formed with said mirror housing.

* * * * *